March 15, 1927.  W. C. LANDAU  1,621,170

FISHWAY

Filed July 17, 1925

Inventor
William C. Landau
By Chas. J. Williamson
his Attorney

Patented Mar. 15, 1927.

1,621,170

UNITED STATES PATENT OFFICE.

WILLIAM CHARLES LANDAU, OF LANCASTER, PENNSYLVANIA.

FISHWAY.

Application filed July 17, 1925. Serial No. 44,404.

The present invention is a fishway usually employed at or in the vicinity of river dams or other obstructions which prevent or seriously hinder the travel of fish up-stream.
It is the purpose of this invention to provide a waterway of a comparatively inexpensive and simple construction in which a relatively large body of water may be maintained therein to encourage the natural habits of the fish in traversing the fishway, the entrance and exit being disposed respectively above and below the dam and at points as near the bottom of the river or stream as desired.
A further object of the invention is the provision of means causing a flow or circulation of water through the fishway which prevent mud or other sediment from collecting therein, and of other means for controlling rises and overflows in the river or stream which may render the circulation ineffective.

The invention consists in whatever is described by or is included within the terms or scope of the appended claims.

In the drawings which show the preferred embodiment of the invention as at present devised:

Figure 2:
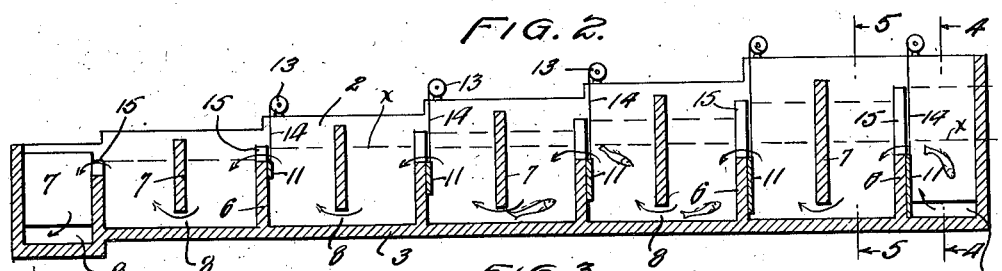
Fig. 2 is a longitudinal vertical sectional view through one section of the fishway, as illustrated in Fig. 1, and taken substantially on line 2—2 thereof.
Figures 4, 5:
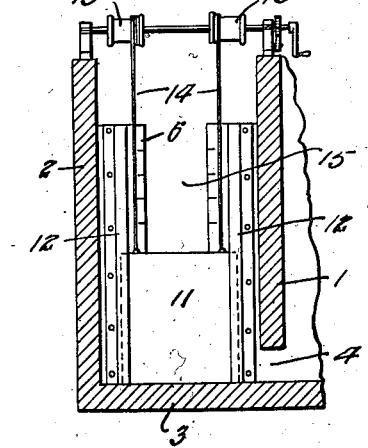

Fig. 4 is a vertical sectional view taken substantially on line 4—4 of Fig. 2, and showing the provision of overflow gates, and Fig. 5 is a vertical section view taken substantially on line 5—5 of Fig. 2, showing on enlarged scale a front view of the underflow partition in the fishway.

Referring in detail to the drawings, the fishway comprises a trough or a channel constructed of any suitable material, such as for instance, concrete, comprising preferably, side walls, 1 and 2, and a bottom, 3. Wherever possible rock-bottom may be used.
The fishway is designed to extend along the bank of a river or stream and to have its ends discharging thereinto at points above and below a dam or other obstruction which may cause a drop in the water level of the stream. In the present showing in Fig. 1, the fishway is shown as extending for a distance down the stream from its inlet, 4, and then extending backwardly toward the dam to a point preferably immediately below the same, where it is provided with an outlet, 5. This construction is employed when it is desired to have the fish entrance-opening or outlet, at a point immediately below the dam where the fish gather, and to have the water inlet at a point immediately above the dam. Of course, it is within the purview of the invention to have the fishway extend in a straight or rectilinear direction. The bottom, 3, of the runway is stepped downwardly or on a suitable incline to provide a drop of about a foot and one-half to every twenty feet (see Fig. 3), at which distances are provided overflow partitions, 6, which progressively drop in height at approximately the same distances. Between the transverse overflow partitions, 6, and at equal distances therebetween, are transverse underflow partitions, 7, which are spaced from the bottom, 3, of the fishway a suitable distance, say two feet, providing passages, 8. The inlet and outlet openings, 4 and 5, to the fishway are provided at the bottom of the fishway and below the adjacent overflow partitions, 6, thereof, similarly as are the passages, 8, and as here shown these openings are formed in the side walls of the fishway and communicate with suitable channels or conduits, 9 and 10, opening into the stream.

It will thus be seen that water flowing into the inlet through the channel, 9, and through the inlet opening, 4, will find its level which is normally (for low water level) as indicated by the dash line $x$—$x$ in Fig. 2, and will, therefore, flow through the fishway in a vertical sinuous course, as it is so compelled, by virtue of the alternating overflow and underflow partitions, 6 and 7, throughout the length of the fishway.

In order to take care of rises in the river level on the upper side of the dam, a suitable number of overflow partitions, 6, nearest the inlet end of the runway are provided with overflow gates, 11, which may be raised and lowered according to the amount of rise in the normal water level. In the present showing the first four overflow partitions are shown equipped with the gateways, 11, in contemplation of a rise of eight feet, more or less, in the normal level. For instance, should the level of the stream rise a foot and one-half or two feet above the normal low water level, the gate, 11, furthermost from the inlet, 4, would be raised a foot and one-half to take care of this overflow and prevent the same from destroying the proper sinuous circulation of the water through the fishway. If the rise increases a corresponding amount, the water-gate, 11, next nearest the inlet, 4, would be raised three to four feet, and so on successively according to the rise in the water level. The gates, 11, are here shown in the form of vertically slidable plates held in position by guide-strips, 12, secured to the partitions, 6, the gates being raised and lowered by means of a suitable wench, 13, on which cables, 14, connected to the gates may be wound. This showing of the gates and their operating means is merely conventional, as any desired type or construction of gate may be used as a substitute therefor.

Figure 1:
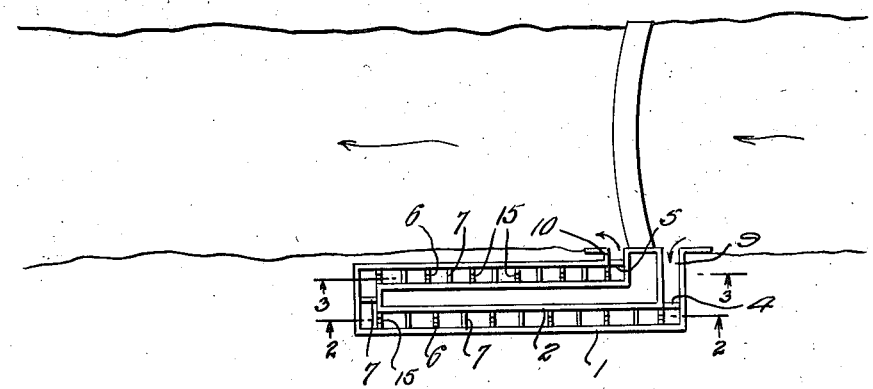
Fig. 1 is a plan view illustrating a stream of water and the fishway of the invention constructed along the stream with its entrance and exit openings on opposite sides of a dam.
Figure 3:
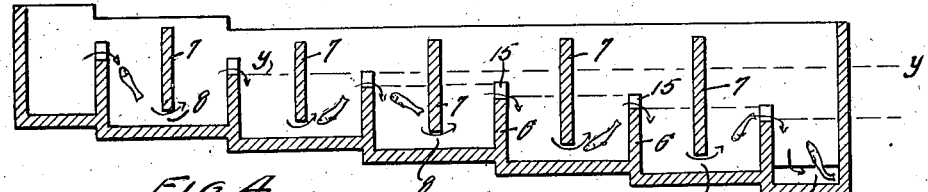
Fig. 3 is a longitudinal vertical sectional view of another section of the fishway taken substantially on line 3—3 of Fig. 1.

In order to take care of backwater on the lower side of the dam, the underflow partitions, 7, are built to extend upwardly for a desired height to take care of customary, as well as reasonable abnormal rises, in backwater or tidal flow, and thereby prevent a rise in the water level y—y in Fig. 3, from flowing over the partitions, 7, and destroying the sinuous course or circulation of the water through the fishway. As before stated, the fishway may extend along the bank of the stream in a substantially straight line or may be constructed, as shown in Fig. 1, to have its inlet and outlet ends adjacent the dam.

In instances where the water-gates, such as 11, are used for purposes of taking care of overflow, the bottom or floor level of the fishway may be substantially straight or horizontal for a distance corresponding to the number of gates used. From this point on, the upper ends of the partitions, 6, successively drop in height corresponding to the desired drop in water level of the fishway as previously explained, say for instance, one and one-half to every twenty feet.

The upper ends of the partitions, 6, are provided in their longitudinal center with a slot or cut-out portion which extends downwardly of the partition for a distance corresponding to the degree of drop in the water level between each succeeding partition, 6. This construction causes the normal flow of water by the partitions, 6, to be checked or concentrated to pass through the cut-out portions, 15, thereby providing a volume of water of considerable depth through which the fish may pass without actually jumping the partition (if the fish so desires), and at the same time drawing only a comparatively small quantity of water from the dam.

The underflow passages, 8, extend preferably, across the entire width of the fishway and by being arranged in front of each overflow partition, 6, the water is caused to rise or flow upwardly in front of each partition, 6, as indicated by the arrows, whereby the mud, gravel or other sediment which may tend to lodge in the bottom of the fishway between the partitions, 6, is constantly agitated and carried over the next succeeding partition, 6, and so on until the end of the fishway is reached, whereby the fishway is kept free of mud or from filling up with other sediment. Also, the passages, 8, and their associate partitions, 7, act as a check relieving the pressure of backwater, especially at the first overflow above the dam where the backwater pressure is greatest.

It is, of course, understood that the partitions, 6, which are equipped with gates, 11, are constructed to a suitable height to take care of the maximum elevation to which the gate may be raised and that the cut-out portions, 15, thereof, are of correspondingly greater depth, as clearly seen in Fig. 4.

From the above, it will be clear that a fishway is provided containing a relatively wide and deep body of water, but through which there is a relatively small flow drawn from the dam. Such a large body of water allows the fish the proper amount of room in which to negotiate their jump over the partitions, 6, without becoming frightened, and without having any pre-arranged plan for the fish to follow, but permitting it to exercise its natural habits in traversing the fishway. After the fish has passed over the first partition, 6, it is a natural habit with it to submerge to the bottom and there to pass through the pasageway, 8, under the first partition, 7, and so on up the fishway. Therefore, it can be seen that the vertical sinuous course provided by the arrangement of the partitions, 6 and 7, has a twofold purpose, first of providing a means for keeping the fishway free of mud and other sediment, and second to provide a passageway which conforms to the natural habits of fish in ascending a so-called "stepped fishway". Also by having the water inlet at the bottom, or thereabout, of the river above the dam, the ingress of ice and other débris which would destroy or otherwise clog up the fishway cannot occur. Also by having the water inlet so located, mud or other sediment collecting on the up-stream side of the dam will for a comparatively large area be prevented from settling, which would lessen the water reserve capacity of the dam, but will be drawn through the fishway.

In order that some conception may be gained of the proportions of the present fishway, it will be here stated that the space between the partitions, 6 and 7, should be at least eight feet wide and eight feet deep, the thickness of the walls and the partitions being such as will give proper strength and durability. While the overflows, 15, are only about one third as wide as the channel and drawing only a comparatively small quantity of water from above the dam, the underflow passage, 8, should be the full width of the channel or about three times as large as the overflows, 15. If the undercurrent through passages, 8, was confined to a much less area, it would be difficult for the fish to pass therethrough, although the flow of undercurrent through passages, 8, of the suggested proportions, or even larger, is sufficient to maintain the fishway free of sediment as above described. While these dimensions are given they may be varied as found necessary and desirable and the same is true with regard to the purposed floor level drop between the partitions, 6.

What I claim is:

1. A fishway comprising a channel through through which water may flow, means in the fishway to provide a plurality of lowering water-levels progressing in the direction of the flow of water through the fishway, and means for directing the flow to the bottom of each level so as to prevent sediment from collecting on the bottom of the fishway.

2. A fishway comprising a channel through which water may flow in a general horizontal direction, and means in the channel for causing the water therein to circulate in an up and down sinuous course and to lower the water-level therein progressively comprising a succession of vertical partitions, alternate partitions reaching to the bottom of the fishway, and alternate partitions having their lower edges spaced above the fishway bottom whereby collection of sediment on the bottom of the fishway is prevented.

3. A fishway comprising a channel, a plurality of spaced transverse partitions in the channel of relatively different heights for progressively lowering the water-level in the channel, and a plurality of other transverse partitions in said channel one disposed between adjacent first mentioned partitions and spaced therefrom and from the bottom of said channel, the upper ends of said second partitions extending above the ends of said first mentioned partitions.

4. A fishway comprising a channel, a plurality of spaced transverse partitions in the channel of relatively different heights for progressively lowering the water-level in the channel, and a plurality of other transverse partitions in said channel one disposed between adjacent first mentioned partitions and spaced therefrom and from the bottom of said channel, the upper ends of said second partitions extending above the ends of said first mentioned partitions, certain of said second mentioned partitions nearest the outlet end of the channel extending a greater distance above the first mentioned partitions to prevent backflow of water from passing over the same.

5. A fishway comprising a channel, a plurality of spaced transverse partitions in the channel of relatively different heights for progressively lowering the water-level in the channel, and a plurality of other transverse partitions in said channel one disposed between adjacent first mentioned partitions and spaced therefrom and from the bottom of said channel, the upper ends of said second partitions extending above the ends of said first mentioned partitions, certain of said first mentioned partitions adjacent the inlet opening of the channel having vertically adjustable water-gates for controlling the flow of water through the fishway.

6. A fishway comprising a channel, a plurality of spaced transverse partitions in the channel of relatively different heights for progressively lowering the water-level in the channel, and a plurality of other transverse partitions in said channel one disposed between adjacent first mentioned partitions and spaced therefrom and from the bottom of said channel, the upper ends of said second partitions extending above the ends of said first mentioned partitions, certain of said second mentioned partitions nearest the outlet end of the channel extending a greater distance above the first mentioned partitions to prevent backflow of water from passing over the same, and certain of said first mentioned partitions adjacent the inlet opening of the channel having vertically adjustable water-gates for controlling the flow of water through the fishway.

7. A fishway as set forth in claim 3 further characterized by said first mentioned partitions each being provided with an opening at the upper ends thereof.

8. A fishway comprising a channel through which water may flow in a general horizontal direction, a plurality of transverse partitions arranged in said channel to provide a plurality of progressively stepped water-levels in the fishway, and intermediate transverse partitions in the channel, one arranged between adjacent first mentioned partitions and spaced from the bottom of the channel to provide a water passage and extended above the water-level between said first mentioned partitions whereby water is directed downwards to such passage and collection of sediment on such bottom prevented.

9. A fishway comprising a channel through which water may flow in a general horizontal direction, a plurality of transverse partitions in said channel arranged to lower the level of the water flowing through the channel progressively towards the outlet opening thereof, said partitions being alternately provided with openings in their lower and upper ends the openings at the lower ends reaching to the bottom of the channel to provide water passages without sediment stopping projectings from the bottom, and the openings at the upper ends of the partitions being of less area than the openings at the lower ends of the other partitions, whereby back pressure is produced that provides a condition of water below and above the respective parts that enables fish readily to swim upward therethrough.

In testimony whereof I hereunto affix my signature.

WILLIAM CHARLES LANDAU.